UNITED STATES PATENT OFFICE.

THOMAS WATTS COSLETT, OF BIRMINGHAM, ENGLAND.

TREATMENT OF IRON OR STEEL TO PREVENT THE OXIDATION OR RUSTING THEREOF.

1,007,069.  Specification of Letters Patent.  Patented Oct. 31, 1911.

No Drawing.  Application filed November 25, 1910. Serial No. 594,108.

*To all whom it may concern:*

Be it known that I, THOMAS WATTS COSLETT, a subject of the King of Great Britain, residing at 70-74 Vittoria street, Birmingham, in the county of Warwick, England, have invented certain new and useful Improvements Relating to the Treatment of Iron or Steel to Prevent the Oxidation or Rusting Thereof, of which the following is a specification.

This invention relates to the treatment of iron or steel and has reference to the kind of treatment by which there is imparted to the iron or steel surfaces a protective covering that renders the same capable of resisting, or being unaffected by the action of, moisture or other oxidizing or "rusting" influences.

According to this invention the iron or steel is subjected to the action of phosphoric acid in the presence of zinc or a suitable zinc compound or to the action of a solution of the latter in phosphoric acid or to the action of acidulous zinc phosphate. Zinc, zinc oxid or zinc phosphate may conveniently be used for this purpose, and the solution obtained by the action of the phosphoric acid upon the same is preferably made in a concentrated condition. The concentrated solution obtained may afterward be separated from any sediment or excess of zinc or zinc compound that may be present and then be applied directly to the iron or steel articles for a short time, or be diluted with water to any desired extent before the iron or steel articles are immersed therein or treated with it. Or the strong solution may be applied direct to a surface on which a deposit has been obtained by action of dilute solution.

A suitable formula for preparing the concentrated solution may be as follows comprising the ingredients given in or about the proportions stated:—

Zinc _____ 6 oz.
Phosphoric acid _____ 1 pint.
Water _____ 1 pint.

Heat may or may not be employed as an aid in dissolving the solid portions of the ingredients.

In order to render the solution in diluted form, it is simply necessary to add 1 oz. of the concentrated solution to each gallon of water. For the purpose of renewing the dilute solution there is added to each gallon thereof a ¼ oz. or less of the concentrated solution as and when required. As an illustration of the extent to which the concentrated solution may be diluted, it may be stated that when 10 cubic centimeters of a dilute solution, yielding satisfactory results, were mixed with 10 cubic centimeters of a saturated solution of pure sodium chlorid, the neutralization of the mixture was effected by 6.7 cubic centimeters of decinormal sodium hydrate solution. Using the factor .00486, this titration indicates that the dilute solution contained .32562 grams of free acid per 100 cubic centimeters.

Under certain circumstances, it may be of advantage to treat the iron or steel with a solution containing not only zinc phosphate but also iron phosphate which of itself is a known agent for obtaining a protective coating on iron or steel. In this case, iron filings or a suitable iron compound and granulated zinc, or a suitable zinc compound, may be dissolved in strong or dilute phosphoric acid; if dilute acid is used the dilute solution of the iron and zinc compounds may be concentrated until a strong solution is obtained. In either case the strong solution may be separated from any remaining solid matter and diluted to any desired extent or be applied for a short time direct to the surface of the iron or steel, or to a surface upon which a deposit has already been obtained by the action of the dilute solution.

The treatment of the iron or steel with phosphoric acid and zinc or a suitable zinc compound, or with a solution of zinc phosphate may be carried out in conjunction with known methods of treating iron or steel for the production of a coating of phosphate of iron. In this connection a strong solution of zinc in phosphoric acid obtained as above described may be added in suitable proportions to a strong solution of iron in phosphoric acid and be subsequently used direct, or diluted, if desired, or the aforesaid solution either concentrated or dilute of zinc in phosphoric acid may be added to the liquid contained in the vessel in which the deposit of phosphate of iron on the iron or steel is being effected. The effect of the zinc phosphate solution on the surface of the iron or steel under treatment would apparently be similar to that of phosphoric acid on metallic zinc, as necessarily a certain amount of zinc must be dissolved to form phosphate of zinc before any deposition is formed. The coating consists essentially of normal zinc phosphate mixed with small amounts of normal ferrous phosphate and free phosphoric acid. The latter could, however, be reduced by more thorough washing. The normal ferrous phosphate is no doubt obtained by the inter-action of the free phosphoric acid with the metal treated. Iron or steel that has already had a coating of phosphate of iron formed upon it may if desired be subjected to the action of the zinc solution, or of phosphoric acid in presence of zinc or a suitable zinc compound.

The formation of the deposit on the iron or steel or surface under treatment may be accelerated by passing an electric current through the dilute solution which may be either in a hot or a cold condition. In adopting such a method of procedure the passage of the electric current through the bath containing the aforesaid solution is effected by the method ordinarily employed by platers, with, for instance, iron anodes. Thus the electric current may be passed through by connecting to the wire from the positive pole of an electric battery or other source of electricity a plate of iron or steel, the metal intended for treatment being attached by wire to the negative pole and thereby acting as a cathode.

Ortho-phosphoric acid or dissolved pyro- or meta-phosphoric acid may be employed in the preparation of the zinc solution, and the proportion of zinc or zinc compound employed to a known amount of phosphoric acid is preferably such that the diluted solution finally obtained contains only comparatively a small percentage of free phosphoric acid.

What I claim and desire to secure by Letters Patent of the United States is:—

1. The treatment of iron or steel for preventing the oxidation or rusting thereof, consisting in subjecting the same to the action of a zinc-containing solution of phosphoric acid.

2. The treatment of iron or steel for preventing the oxidation or rusting thereof, consisting in subjecting the same to the action of a zinc-containing solution of phosphoric acid of varying degrees of concentration.

3. The treatment of iron or steel for preventing the oxidation or rusting thereof, consisting in subjecting the same to the action of a solution of zinc and iron phosphate.

4. The treatment of iron or steel for preventing the oxidation or rusting thereof, consisting in subjecting the same as the cathode to the action of a zinc-containing solution of phosphoric acid through which an electric current is passed.

In testimony whereof I affix my signature in presence of two witnesses.

THOMAS WATTS COSLETT.

Witnesses:
F. J. RAPSON,
T. SELBY WARDLE.